United States Patent [19]

Kalt

[11] 4,094,590
[45] June 13, 1978

[54] ELECTROSTATIC DEVICE FOR GATING ELECTROMAGNETIC RADIATION

[75] Inventor: Charles G. Kalt, Williamstown, Mass.

[73] Assignee: Dielectric Systems International, Inc., Williamstown, Mass.

[21] Appl. No.: 711,610

[22] Filed: Aug. 4, 1976

[51] Int. Cl.² .............................................. G02F 1/16
[52] U.S. Cl. .................................... 350/269; 350/360
[58] Field of Search .................... 350/161 S, 266, 269; 178/7.3 D, 7.5 D

[56] References Cited

U.S. PATENT DOCUMENTS

| | | | |
|---|---|---|---|
| 1,984,683 | 12/1934 | Jenkins | 350/269 |
| 3,553,364 | 1/1971 | Lee | 350/269 |
| 3,897,997 | 8/1975 | Kalt | 350/161 S |
| 3,989,357 | 11/1976 | Kalt | 350/269 |

Primary Examiner—William L. Sikes
Attorney, Agent, or Firm—Connolly and Hutz

[57] ABSTRACT

In an electrostatic device for the gating of electromagnetic radiation in response to an electrical signal, including a fixed and a resilient variable electrode with a film of insulation interposed therebetween, the variable electrode lies adjacent to the fixed electrode defining a line of tangency therebetween. The position of mounting of the variable electrode is spaced from the line of tangency and in this space the variable electrode has a curved portion that minimizes wrinkles therein and provides a lower and more predictable sensitivity. Furthermore, the assembly of such devices tends to become less critical and simpler.

10 Claims, 4 Drawing Figures

4,094,590 with the fixed electrode and to provide a curved surface in the variable electrode within this space is highly advantageous. This curvature eliminates the wrinkles that are likely to be present in the thin variable electrode near the line of tangency and consequently tends to increase the sensitivity of this gate to electrical signals. Also the sensitivity of such gates is much more uniform from unit to unit. It is no longer necessary to take great pains to provide a wrinkle-free mounting of the variable electrode which leads to simpler manufacturing methods and lower costs. It has furthermore been found that the procedure for assembly of the improved device of this invention is greatly simplified as will be further elaborated below.

ELECTROSTATIC DEVICE FOR GATING ELECTROMAGNETIC RADIATION

BACKGROUND OF THE INVENTION

This invention relates to an electrostatic device for the gating of electromagnetic radiation and more particularly to such a device having a resilient variable electrode. An insulative film is bonded to either a fixed or the variable electrodes so as to provide electrical insulation between the two electrodes. In some prior devices of this kind the variable electrode is mounted to the fixed electrode. It is particularly difficult in such structures to provide a mounting of the fixed electrode that does not induce wrinkles in the thin resilient electrode. When the mounting of the variable electrode is spaced from the fixed electrode and the variable electrode is straight in this space, the wrinkles emanating from the mounting are attenuated but still remain a source of variability insensitivity. Such wrinkles tend to radiate away from the mounting and make the variable electrode stiffer. This in turn raises the sensitivity of the gate to an electrical signal that is applied between the two electrodes to cause the variable electrode to be drawn to and become coadunate with the fixed electrode. Furthermore, in manufacturing a large number of such devices the sensitivity of the devices from unit to unit is not uniform.

It is therefore an object of this invention to provide an electrostatic gate having a greater sensitivity to an applied electrical signal by eliminating wrinkles in the variable electrode.

It is a further object of this invention to provide an electrostatic gate having a more uniform and predictable sensitivity to an applied electrical signal.

It is a further object of this invention to provide an electrostatic gate capable of being assembled in a simple non-critical manner.

SUMMARY OF THE INVENTION

An electrostatic device for the gating of electromagnetic radiation in response to an electrical signal comprises a fixed electrode, a variable electrode being a sheet of resilient conductive material and a film of insulative material that is interposed between the fixed and the variable electrodes. The insulative film may be bonded to the fixed electrode or may be adhered to the variable electrode. The variable electrode is fixedly mounted at a region thereof having at least one essentially straight edge. It then extends at right angles from the straight edge to a line of tangency with the fixed electrode. The variable electrode further extends from the tangent line away from the variable electrode. When a signal voltage is applied between the fixed and variable electrodes, the further extended portion of the variable electrode is electrostatically drawn toward and becomes coadunate with the fixed electrode.

In one construction, the fixed electrode has a curved surface portion that includes the above-noted line of tangency with the variable electrode. In another construction the variable electrode has a curved surface portion that includes the above-noted line of tangency with the fixed electrode. In any case, the axes of electrode curvature are essentially parallel with the line of tangency and the bend is convex toward the fixed electrode.

It has been found that to substantially space the position of mounting of the variable electrode from the line

DESCRIPTION OF THE PREFERRED EMBODIMENT

Figure 1:
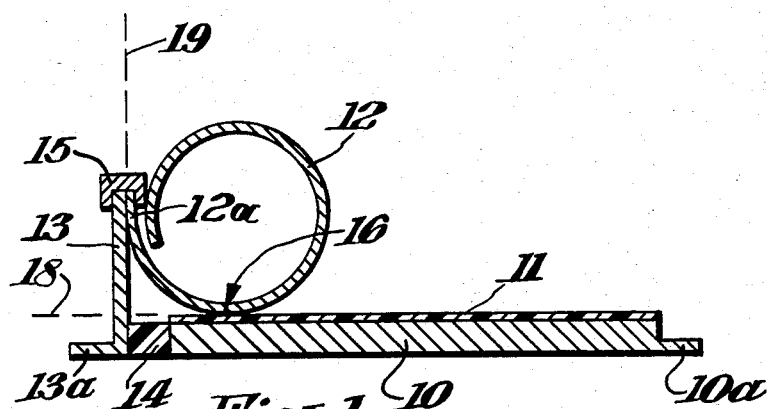
FIG. 1 shows in cross section a side view of an electrostatic gate of this invention having a rolling variable electrode.

There is shown in FIG. 1 a first preferred embodiment of this invention wherein a metal plate 10 serves as a fixed electrode, insulation film 11 is an insulative layer on a top surface of the fixed electrode 10, and a resilient metal sheet 12 serves as a variable electrode. The variable electrode is in the form of a spiral roll, although generally in such a gating device it may be larger and have more spiral turns, or it may be shorter and have the form of only a portion of a turn of a spiral roll. A metal L-shaped piece 13 is adhesively mounted to and insulated from the plate 10 by means of an insulative block 14. The rectangular surface end portion 12a of the variable electrode 12 is mounted to the upright portion (as shown) of the piece 13 by means of a compressive or conductively-bonded metal channel 15. The tab portion 13a of the piece 13 and the tab portion 10a of the base plate 10 serve as terminals by which an electrical signal may be applied between the fixed and the variable electrodes.

When an electrical voltage of sufficient magnitude is applied, the resilient electrode is electrostatically attracted to and drawn into more intimate contact with the insulative film 11, and thus tends to become coadunate with the fixed electrode 10. The minimum applied voltage necessary to initiate this action is referred to as the threshold voltage of the gate device. The reflectivity to electromagnetic radiation of the upper surface (as shown) of the insulative film is made substantially different from that of the inner surfaces of the spiral shaped variable electrode. Thus the relative reflectance of ambient radiation such as light is altered, as seen from the top (as shown) of the device, when a voltage is applied having a voltage exceeding the characteristic threshold voltage of the device. Alternatively, in such devices the film 11 and base 10 may be of transparent materials in which case the radiation transmission of the device is electrically alterable.

In accordance with the principle of this invention, a lower-most (as shown) portion of the curved variable electrode 12 lies adjacent to the fixed electrode and defines a line of tangency therebetween, the end view of which is indicated by arrow 16. The mounting at region 12a of the variable electrode may be adjusted so that the variable electrode is tangent to, but not deformed and compressed against, the base plate 10. Alternatively and preferably, the variable electrode is spring loaded against the base plate 10 at the line of tangency. In the latter case the variable electrode may flatten slightly at the "line" of tangency but essentially without effect on the threshold voltage of the device and this construction is considered to be entirely within the scope of the invention.

Contrary to prior devices of this type, wrinkles in the thin variable electrode of the present invention that tend to radiate from the mounting region thereof, are progressively attenuated in the space between the mounting and the line of tangency especially because of the substantial bend existing in the variable electrode in this space. It has been found in general that the amount of bend necessary to effectively eliminate the wrinkles in the variable electrode at the line of tangency should exceed the angle of about 10 degrees. The angle is measured in this case between the two imaginary planes indicated by dashed lines in FIG. 1. Plane 18 includes the top surface of the insulation layer 11, or equivalently further purpose is defined as the plane that is tangent to the curved portion of the variable electrode at the line of tangency. The plane 19 is defined as the plane of the mounted surface region 12a of the variable electrode 12.

Figure 2:
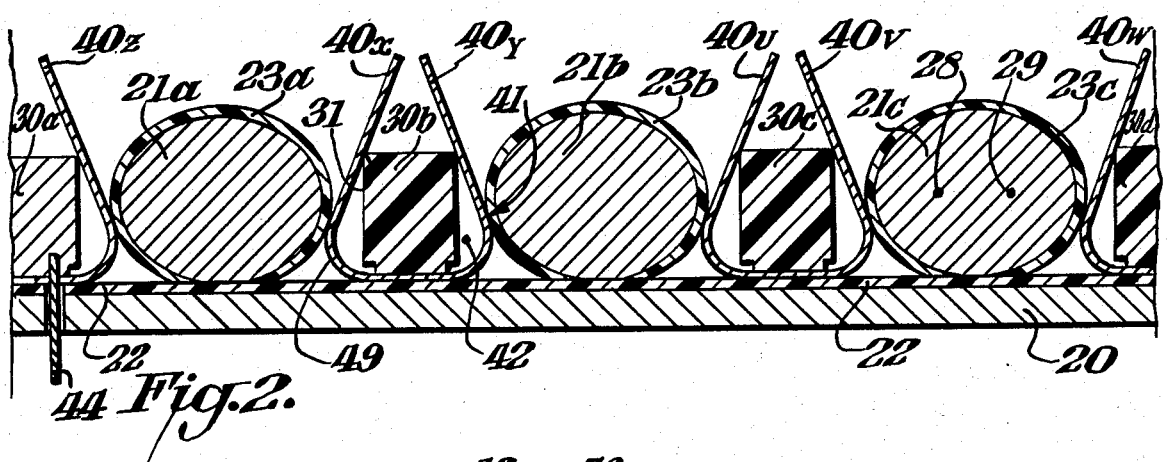
FIG. 2 shows in cross section a side view of an assembly including a plurality of electrostatic gates of this invention.

A plurality of electrostatic devices of this invention are shown in a mutually cooperative assembly in FIG. 2. A metal base plate 20 has a plurality of equally spaced parallel metal ellipsoids that serve as fixed electrodes 21a, 21b, and 21c. They are mechanically and electrically attached to the top surface thereof by welding, conductive bonding, or any other appropriate means. The end views of the axes of the ellipsoidal fixed electrode 21c is illustrated by the dots 28 and 29. Of course, in general a wide variety of curved rod shapes are suitable for the fixed electrode, such as rods having a plurality of parallel axes of curvature. The remaining top surface of base plate 20 is covered by an insulative film 22. The exposed ellipsoidal surfaces of the fixed electrodes 21a, 21b, and 21c are also covered by insulative films 23a, 23b, and 23c, respectfully.

Figure 3:
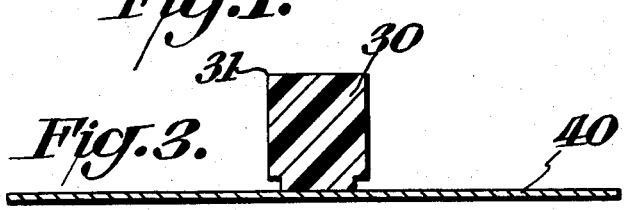
FIG. 3 shows in side sectional view a subassembly including a mounting block with a resilient conductive sheet attached to the under side thereof. Two ends of this sheet will serve as two variable electrodes in the assembly of FIG. 2.

The remainder of the assembly of FIG. 2 is completed by adding a plurality of sub-assemblies, one of which is illustrated by FIG. 3. The sub-assembly of FIG. 3 is comprised of a rectangular block 30 having a conductive resilient sheet 40 being bonded to the flat lower surface thereof. Each such sub-assembly is inserted into a space between two adjacent fixed electrodes, e.g. between fixed electrodes 21a and 21b. In so inserting the sub-assembly, the resilient sheet is forced to bend, to form a spring loaded contact with the adjacent insulated fixed electrodes at the line of tangency with each.

Referring again to FIG. 2, the sub-assembly including block 30b is mounted in the space between fixed electrodes 21a and 21b so that the end 40x of the resilient sheet is forced upward and against the insulated fixed electrode 21a; and similarly end 40y is forced against electrode 21b. It is preferred that the angle of bend in the variable electrode, as measured between the plane of variable electrode mounting and the plane of tangency with the fixed electrode, be at least 90° to achieve a wide viewing angle in operation.

The spring loaded contact between these resilient sheets 40 and an adjacent insulated fixed electrode is exemplified with reference to the resilient sheet end 40y and adjacent electrode 21b in FIG. 2. A line of tangency 41 is defined at this contact, the end view of which is indicated by the arrow. The bend in sheet 40y has a curvature with which there is associated at least one geometrical axis 42 that is indicated by the dot at the tip of the arrow in the figure. This bend greatly attenuates any wrinkles that emanate from the location of mounting of the resilient sheet variable electrode 40y.

It will also be readily appreciated that the method of assembly of this structure is basically simple. Besides greatly reducing the need for meticulous care in the mounting of the variable electrode to avoid introducing wrinkles into the thin variable electrode, the simple step itself of inserting the sub-assembly between fixed electrodes and mounting it there is not particularly critical. That is, perfect registration of the sub-assembly in a central and parallel position between the fixed electrodes is not required and may be offset from such perfect alignment by as much as 20° from true parallelism with the axis of an adjacent fixed electrode and as much as 10% off center without substantial effect on the characteristic threshold voltage of the completed device.

Figure 4:
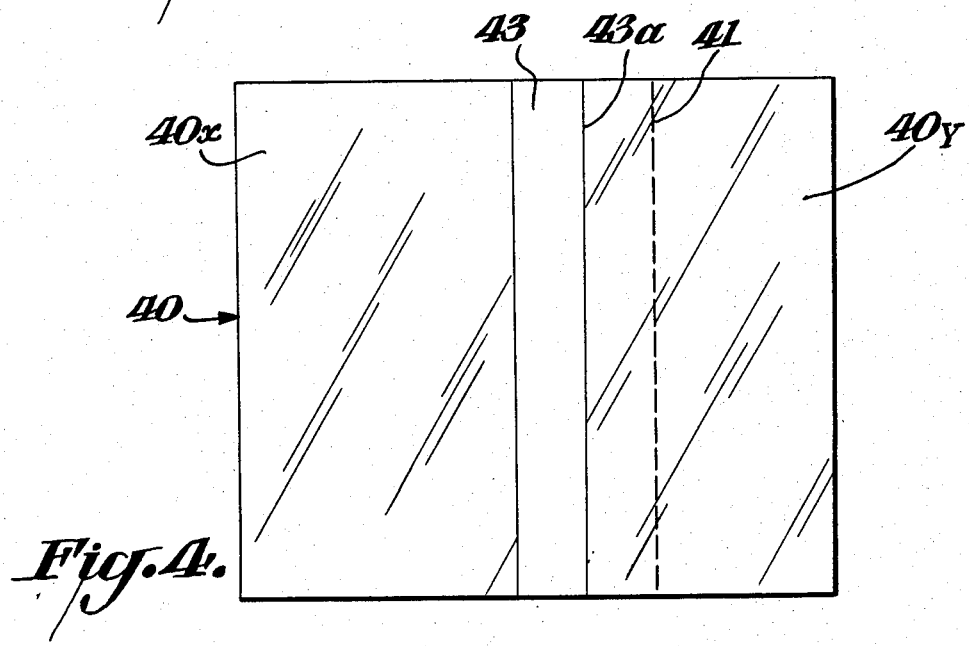
FIG. 4 shows a top view of the variable electrode sheet of FIG. 3.

In the top view of the resilient conductive sheet 40, as shown in FIG. 4, the line of tangency 41 is indicated by a dashed line. Also illustrated is a rectangular surface region 43 that represents the area of mounting contact with the block 30. This region has a straight edge 43a that is essentially parallel to the line of tangency 41. The variable electrode 40y extends away from the mounting region 43 at about right angles from the straight line 43a. This straight line feature helps avoid introducing wrinkles into the variable electrode at the mounting from the outset of assembly. The bonding in this region may be accomplished by the application of a thin layer of adhesive to the bottom surface of the block and subsequently pressing the block against the sheet 40 in surface region 43. The sub-assembly may then be similarly bonded to the insulative layer 20 that covers the base plate. The block may be metal as block 30a and electrical connection thereto may be made by means of a lead wire or pin extending through and spaced from a hole in the base plate 20 as shown. Otherwise the block may be an insulation block such as 30b, 30c, and 30d. In this case electrical contact may be made using a pin similar to pin 44 or by some other lead in the plane of the insulation layer 22 (not shown).

The term line of tangency, as used herein, refers to tangency between the fixed and variable electrodes assuming the interposed insulative film is infinitesimally thin. In practice the dielectric insulative layer, e.g. 23b in FIG. 2, must not be thicker than a few thousandths of an inch, namely less than 0.010 inch, in order to realize a low characteristic threshold voltage. Typically it is less than 0.001 inch thick whereas at the same time the average diameter of the fixed electrode may be on the order of 0.25 inches.

Another advantageous feature of the structure in FIG. 2 is the straight sharp edge 31 in the block 30, against which the variable electrode 40x is pressed as shown. This additionally imparts straighteners to the resilient variable electrode, in the rest position, to further insure a wrinkle-free surface therein at the line of tangency, such as line 41. This feature also helps to orient the variable electrode portions that extend upwardly (as shown) from the line of tangency with the fixed electrode and provide a predictable uniform visual display as seen from the top of the structure.

In operation, a voltage is applied between the base plate 20, that is electrically connected to all of the fixed electrodes in this embodiment, and the variable electrodes 40x and 40y. These variable electrodes are attracted to and drawn down adjacent to the insulated fixed electrodes 21a and 21b. If the inside or upper surface of the sheet 40 has a different reflectivity to radiation such as light than the insulative films 23a and 23b, the appearance then distinctly changes when the device is so activated.

The variable electrodes in the above described embodiments are shown in the figures as a simple metal sheet for the sake of simplicity and clarity. However, it should be understood that the variable electrode can consist in a plastic sheet having at least one of its sides metallized.

Examples of the type of electrostatic light gating devices to which the principles of the present invention are suitably applied are described in my aforementioned U.S. Pat. No. 3,897,997, and my aforementioned application Ser. No. 580,572.

I claim:

1. In an electrostatic device for the control of electromagnetic radiation in response to an electrical signal of the class having a fixed and a resilient variable electrode, and an insulative film interposed therebetween, the improvement comprising said variable electrode being fixedly mounted in a portion thereof and extending therefrom to a line of tangency between said fixed and variable electrodes, said variable electrode further extending from said line of tangency away from said fixed electrode, said variable electrode having a bend in the region between said mounting and said line of tangency, said bend being convex toward said fixed electrode.

2. An electrostatic device for the gating of electromagnetic radiation in response to an electrical signal, comprising a fixed electrode, a variable electrode being a sheet of resilient conductive material, and a film of insulative material being interposed between said fixed and variable electrodes, said variable electrode being fixedly mounted at a surface region thereof and extending therefrom to a line of tangency between said fixed and variable electrodes, said variable electrode further extending from said line of tangency away from said fixed electrode, said variable electrode having a bend in the region between said mounting and said line of tangency, said bend having an axis of curvature that is parallel to said line of tangency and said bend being convex toward said fixed electrode.

3. The electrostatic device of claim 2 wherein said bend is a spring loaded bend and said variable electrode is in pressure contact through said insulative film with said fixed electrode at said line of tangency.

4. The electrostatic device of claim 2 wherein said variable electrode has a curved convex surface portion at which said tangency of said fixed electrode is effected.

5. The electrostatic device of claim 4 wherein the angle between the plane of said mounted region of said variable electrode and the plane that is tangent to said variable electrode at said line of tangency is approximately 90°.

6. The electrostatic device of claim 4 wherein the surface of said fixed electrode that is adjacent to said insulative film is essentially flat and said insulative film is bonded to said fixed electrode.

7. The electrostatic device of claim 2 wherein said fixed electrode has a convex curved surface portion at which said tangency of said variable electrode is effected.

8. The electrostatic device of claim 7 wherein the angle between the plane of said mounted region of said variable electrode and the plane that is tangent to said variable electrode at said line of tangency is at least 90° such that the extent of said bend in said variable electrode is at least 90°.

9. The electrostatic device of claim 7 wherein the surface portion of said fixed electrode, to which said variable electrode may become coadunate when deflected by said electrical signal, is in the shape of a rod having a plurality of mutually parallel axes of surface curvature.

10. The electrostatic device of claim 2 wherein said surface mounting region of said variable electrode has a straight edge and said extending of said variable electrode away from said mounting region is at about right angles to said straight edge.

* * * * *